(12) United States Patent
Strom et al.

(10) Patent No.: US 10,414,532 B2
(45) Date of Patent: Sep. 17, 2019

(54) CONTAINER OPENING SUPPORT SYSTEM

(71) Applicant: Stroms LLC, Fort Collins, CO (US)

(72) Inventors: Douglas D. Strom, Fort Collins, CO (US); Theresa J. Strom, Fort Collins, CO (US)

(73) Assignee: Stroms LLC, Fort Collins, CO (US)

( * ) Notice: Subject to any disclaimer, the term of this patent is extended or adjusted under 35 U.S.C. 154(b) by 0 days.

(21) Appl. No.: 16/154,428

(22) Filed: Oct. 8, 2018

(65) Prior Publication Data

US 2019/0039770 A1 Feb. 7, 2019

Related U.S. Application Data

(63) Continuation of application No. 15/830,819, filed on Dec. 4, 2017, now Pat. No. 10,093,443, which is a continuation-in-part of application No. 15/192,902, filed on Jun. 24, 2016.

(60) Provisional application No. 62/281,080, filed on Jan. 20, 2016, provisional application No. 62/184,687, filed on Jun. 25, 2015.

(51) Int. Cl.
| | |
|---|---|
| *B65B 67/04* | (2006.01) |
| *B65B 67/12* | (2006.01) |
| *B65F 1/14* | (2006.01) |
| *F16B 7/10* | (2006.01) |

(52) U.S. Cl.
CPC ...... *B65B 67/1211* (2013.01); *B65B 67/1205* (2013.01); *B65B 67/1238* (2013.01); *B65B 67/1255* (2013.01); *B65F 1/1415* (2013.01); *B65F 2220/1063* (2013.01); *F16B 7/105* (2013.01)

(58) Field of Classification Search
CPC ....... B65B 67/1205; B65B 67/12; A01G 1/12; B65F 1/1415
USPC ............ 248/95, 97, 99; 294/214; 383/12, 33
See application file for complete search history.

(56) References Cited

U.S. PATENT DOCUMENTS

| | | | |
|---|---|---|---|
| 2,451,829 A | 10/1948 | Hightower | |
| 2,789,781 A | 4/1957 | Miller | |
| 3,744,081 A | 7/1973 | Miller | |
| 4,440,430 A | 4/1984 | Kruse | |
| 4,759,518 A | 7/1988 | Yardas | |
| 4,759,519 A * | 7/1988 | Cheng | B65B 67/1238 248/125.3 |
| 4,815,866 A | 3/1989 | Martone | |
| 4,867,401 A | 9/1989 | Graff | |
| RE33,842 E | 3/1992 | Ebentheuer | |
| 5,180,126 A * | 1/1993 | Bennett | B65B 67/12 248/97 |
| 6,296,212 B1 | 10/2001 | Monahan | |
| 6,446,919 B1 * | 9/2002 | Tsui | B65B 67/1205 248/100 |
| 7,883,062 B2 | 2/2011 | Zima | |
| 10,093,443 B2 * | 10/2018 | Strom | B65B 67/1211 |

(Continued)

OTHER PUBLICATIONS

U.S. Appl. No. 62/184,687, filed Jun. 25, 2015.

(Continued)

*Primary Examiner* — Todd M Epps
(74) *Attorney, Agent, or Firm* — Craig R. Miles; CR Miles P.C.

(57) ABSTRACT

A container opening support system, including an annular member and a securement assembly, positionable inside of an open end of a flexible membrane.

21 Claims, 10 Drawing Sheets

(56) References Cited

U.S. PATENT DOCUMENTS

2006/0010659 A1    1/2006  Penn
2008/0302924 A1   12/2008  Albert
2015/0096601 A1*   4/2015  Haythornthwaite ... A45B 25/22
                                                        135/22
2016/0376049 A1*  12/2016  Strom ................. B65B 67/1211
                                                        248/99

OTHER PUBLICATIONS

U.S. Appl. No. 62/281,080, filed Jan. 20, 2016.
2Bagalot. Bagalot Bag Holder. On-line website, http://www.2bagalot.com, originally downloaded Mar. 31, 2016, 3 total pages.
Grapplers. Benefits of the Handy Bag Ringer. On-line website, http://www.grapplersinc.com, originally downloaded Mar. 31, 2016, 2 total pages.
Leaf Lasso. What Is Leaf Lasso? On-line website, http://www.leaflasso.com, originally downloaded Mar. 31, 2016, 8 total pages.
U.S. Appl. No. 15/192,902, filed Jun. 24, 2016.
U.S. Appl. No. 15/830,819, filed Dec. 4, 2017.

\* cited by examiner

CONTAINER OPENING SUPPORT SYSTEM

This U.S. Patent Application is a continuation of U.S. patent application Ser. No. 15/830,819, filed Dec. 4, 2017, now U.S. Pat. No. 10,093,443, issued Oct. 9, 2018, which is a continuation-in-part of U.S. patent application Ser. No. 15/192,902, filed Jun. 24, 2016, which claims the benefit of U.S. Provisional Patent Application No. 62/281,080, filed Jan. 20, 2016, and U.S. Provisional Patent Application No. 62/184,687, filed Jun. 25, 2015, each hereby incorporated by reference herein.

I. FIELD OF THE INVENTION

A container opening support system including an apparatus and methods of making and using such apparatus which can be used to support an open end of a flexible container in an open condition to facilitate filling the interior of the flexible container with one or more containable materials.

II. SUMMARY OF THE INVENTION

Accordingly, a broad object of particular embodiments of the invention can be to provide an apparatus including one or more of an annular member, including a first segment having a pair of first segment tubular end portions and a second segment having a pair of second segment end portions slidably disposed inside of the pair of first segment tubular end portions, and a securement assembly, including a tubular member disposed about each of the pair of first segment end portions and having a biasing portion terminating in a pawl and a plurality of teeth disposed on each of the pair of second segment end portions, whereby the biasing portion removably engages the pawl with the plurality of teeth.

Another broad object of particular embodiments of the invention can be to provide a method of making an apparatus including one or more of disposing a first segment medial portion between a pair of first segment tubular end portions, each terminating in a tube end, disposing a second segment medial portion disposed between a pair of second segment end portions, disposing a plurality of teeth in spaced apart relation on each of the pair of second segment end portions, obtaining a pair of tubular members each having a biasing portion terminating in a pawl, disposing one of the pair of tubular members about each of the pair of first segment tubular end portions, the biasing portion disposing the pawl adjacent the tube end, and slidably disposing the pair of second segment end portions inside of the pair of first segment tubular end portions to generate an annular member, the biasing portion of the pair of tubular members engaging the pawl to fix position of the pair of second segment end portions in the pair of first segment tubular end portions, the biasing portion resiliently deformable to disengage the pawl from the plurality of teeth.

Another broad object of particular embodiments of the invention can be to provide a method of using an apparatus including one or more of: sliding a pair of first segment tubular end portions of a first segment of an annular member over a pair of second segment end portions of a second segment of the annular member, and biasing a biasing portion terminating in a pawl coupled to each of the pair of first segment tubular end portions against a plurality of teeth disposed in spaced apart relation on each of the pair of second segment end portions to fix position of the first segment in relation to the second segment.

Another broad object of particular embodiments of the invention can be to provide a method of using an apparatus including one or more of: inserting said annular member inside an open end of a flexible container and adjusting the annular member between a contracted condition bounding a lesser interior space toward an expanded condition bounding a greater interior space, engaging a tack layer disposed on an annular member perimeter with an internal surface of the open end of said flexible member, and gripping a handle coupled to the annular member and extending to the interior space bound by the annular member.

Naturally, further objects of the invention are disclosed throughout other areas of the specification, drawings, photographs, and claims.

III. BRIEF DESCRIPTION OF THE DRAWINGS

IV. DETAILED DESCRIPTION OF THE INVENTION

Figure 1:
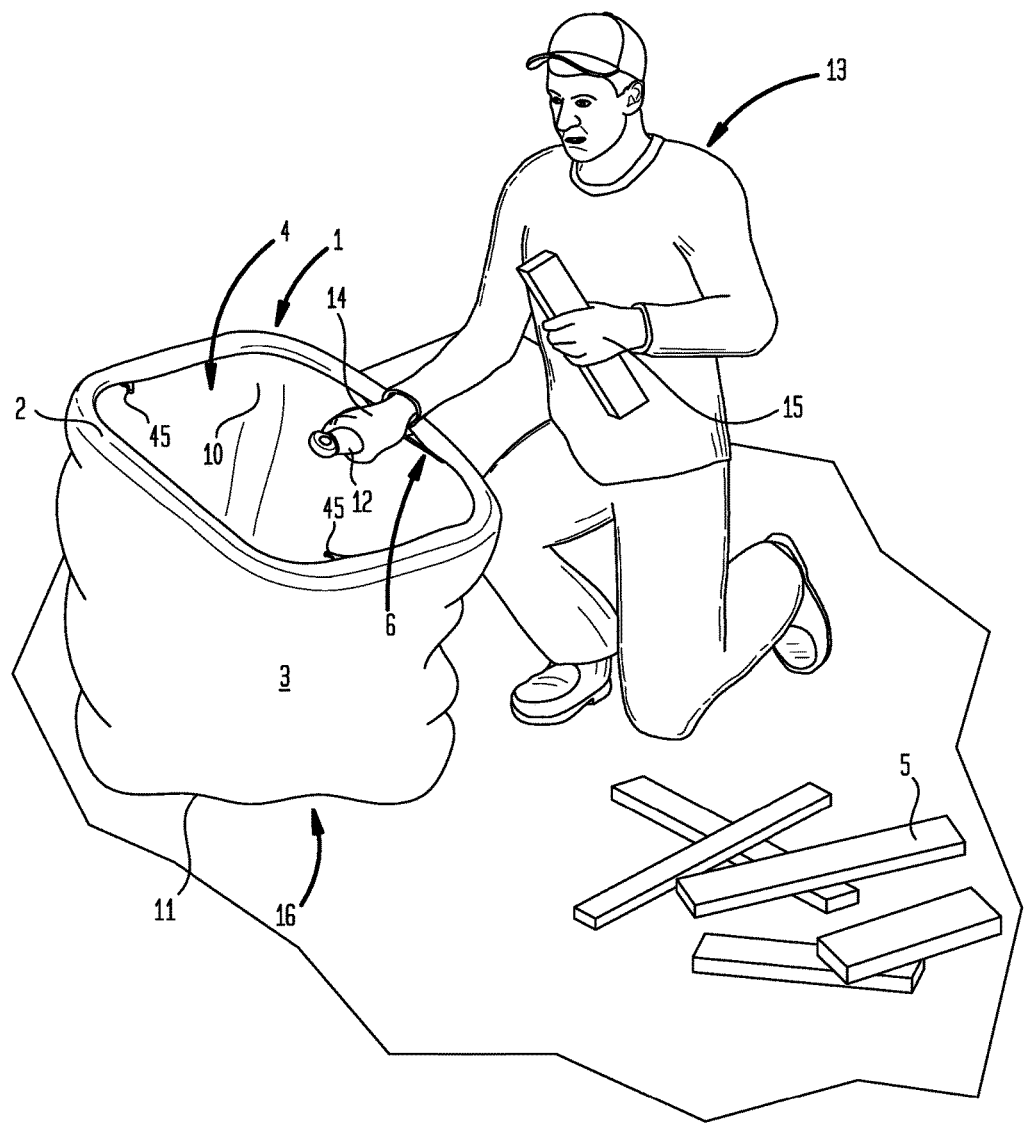
FIG. 1 is an illustration of a method of using a particular embodiment of the container opening support system.
Figure 2:
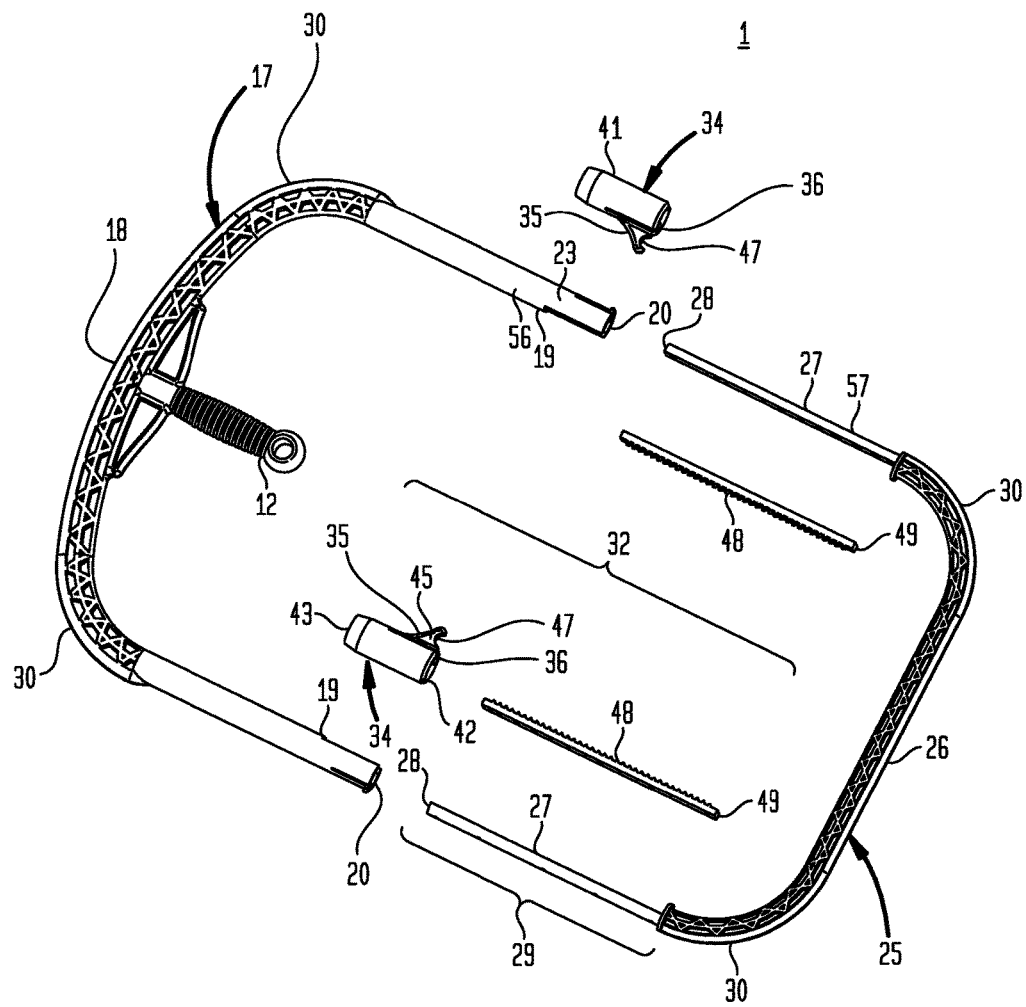
FIG. 2 is an exploded view of a particular embodiment of the container opening support system.
Figure 3:
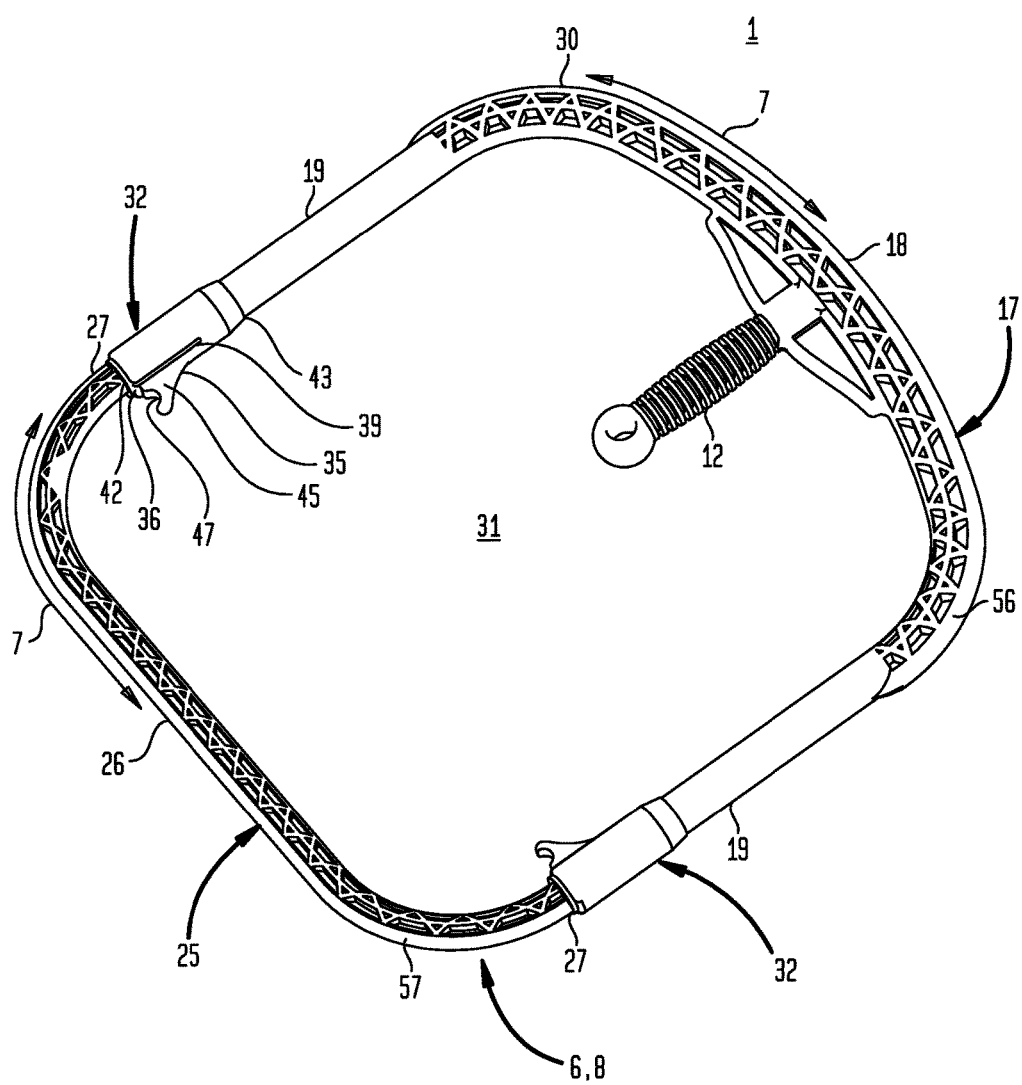
FIG. 3 is a top plan view of a particular embodiment of the container opening support system illustrating a contracted condition.
Figure 4:
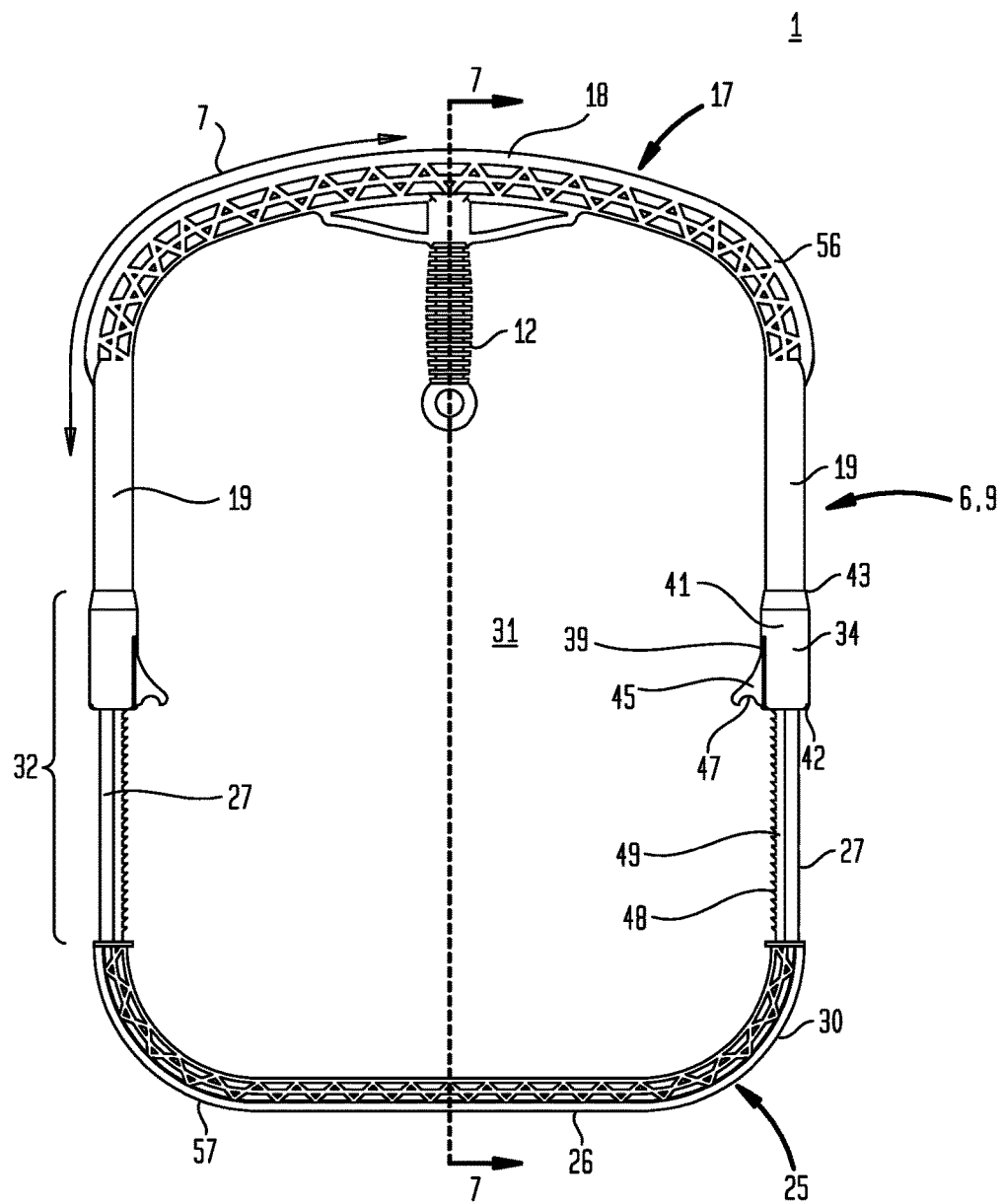
FIG. 4 is a top plan view of a particular embodiment of the container opening support system illustrating an expanded condition.
Figure 5:
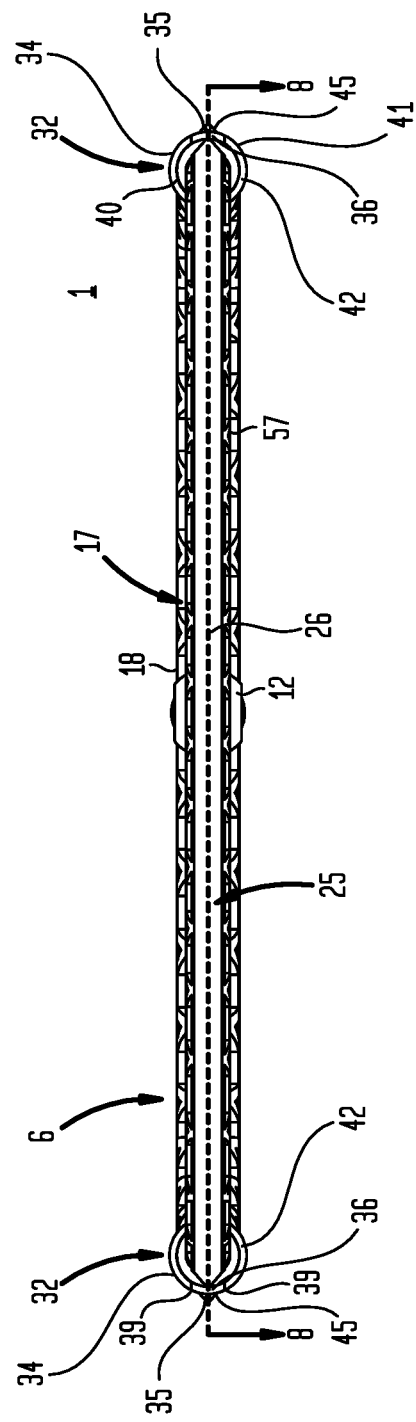
FIG. 5 is a bottom elevation view of a particular embodiment of the container opening support system.
Figure 6:
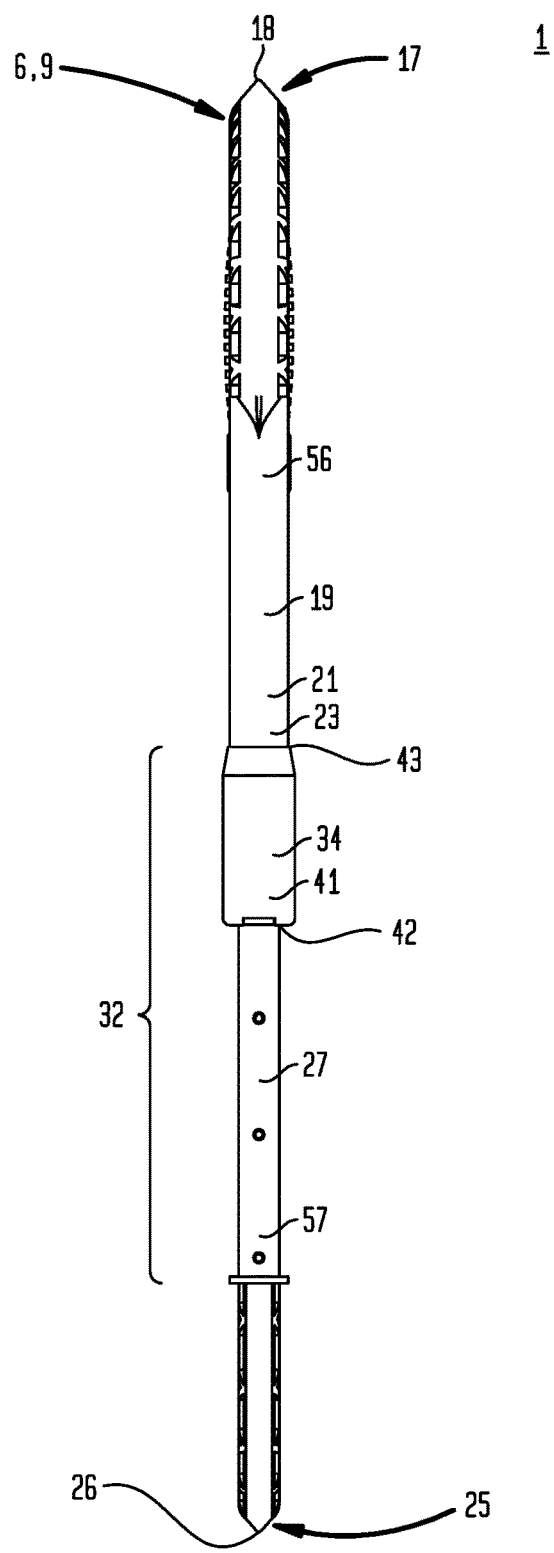
FIG. 6 is a side elevation view of a particular embodiment of the container opening support system.
Figure 7:
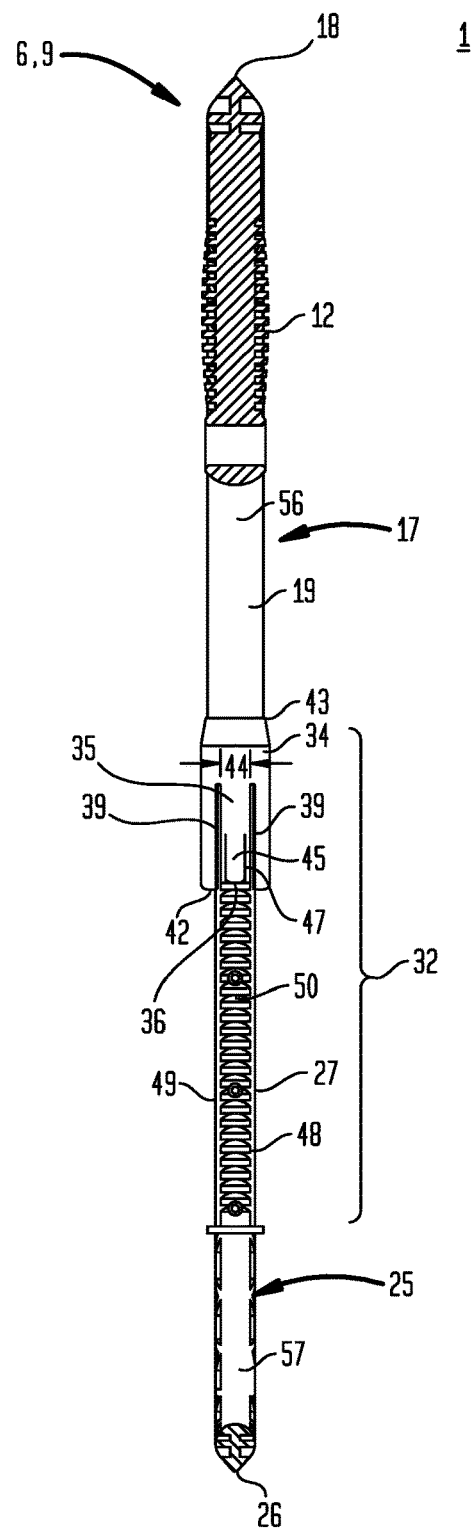
FIG. 7 is a cross-sectional view 7-7 of a particular embodiment of the container opening support system shown in FIG. 4.

Now referring generally to FIGS. 1 through 9, which illustrate a container opening support system (1) including apparatus and methods of making and using such apparatus which can be used to support an open end (2) of a flexible container (3) in an open condition (4) to facilitate filling the interior of the flexible container (3) with one or more containable materials (5). Embodiments of the apparatus can include an annular member (6) having an annular member perimeter (7) which can be perimetrically adjusted between a contracted condition (8)(as shown in the example of FIG. 3) insertable within an open end (2) of the flexible container (3) toward an expanded condition (9) (as shown in the example of FIG. 4) which can sufficiently tension or apply outwardly directed forces to the internal surface (10) of the flexible container (3) to support and maintain the open end (2) in the open condition (4)(as shown in the example of FIG. 1). While embodiments of the flexible container (3) are depicted as having an open end (2) opposite a closed end (11); this is not intended to preclude use of the of the container support opening system (1) with any flexible tubular membrane having at least one open end (2) engageable with the annular member (6), such as a tubular flexible membrane having a first open end (2) opposite a second open end (2).

Again, referring generally to FIGS. 1 through 9, the container opening support system (1) can, but need not necessarily, further include a handle (12) coupled to the annular member (6). The handle (12) can be gripped by a user (13) to move the opening support (1) from location to location or to position the open end (2) of a flexible container (3) in relation to containable materials (5). The containable materials (5) can be transferred into the interior of the flexible container (3) while the annular member (6) supports and maintains the open end (2) in the flexible container (3) in the open condition (4). While the illustrative example of FIG. 1 depicts containable materials (5) as being elongate rectangular objects, this is not intended to preclude any of a wide variety of containable materials (5) which can be transferred to the flexible container (3), such as: detritus, debris, waste, refuse, rubble, sweepings, trash, dirt, leaves, grass, or the like. In particular embodiments, a user (13) can grip the handle (12) of the opening support (1) with only a first hand (14) to position the open end (2) of the flexible container (3), thereby leaving a second hand (15) free to transfer the containable materials (5) into the interior of the flexible container (3). Upon receipt of the containable materials (5) within the interior of the flexible container (3), the annular member perimeter (7) can be perimetrically adjusted toward the contracted condition (8), thereby relieving the tension or decreasing the outwardly directed forces applied to the open end (2) allowing the opening support (1) to be disengaged from the flexible container (3). Subsequently, the open end (2) flexible container (3) can be disposed in a closed condition to enclose the containable materials (5) within the flexible container (3).

Now referring primarily to FIGS. 2 through 9, particular embodiments of the annular member (6) can include a first segment (17). The first segment (17) can include a first segment medial portion (18) disposed between a pair of first segment tubular end portions (19). The pair of first segment tubular end portions (19) can, but need not necessarily, be disposed generally orthogonal to the first segment medial portion (18). Each of the pair of first segment tubular end portions (19) can terminate in a first segment tubular end (20). Each of the pair of first segment tubular end portions (19) can have a tubular wall (21) having a tubular wall interior and exterior surface (22)(23). The tubular wall interior surface (22) defines a first segment tubular end portion interior space (24).

Again, referring primarily to FIGS. 2 through 9, particular embodiments of the annular member (6) can include a second segment (25). The second segment (25) of the annular member (6) can include a second segment medial portion (26) disposed between a pair of second segment end portions (27). The pair of second segment end portions (27) can, but need not necessarily, be disposed generally orthogonal to the second segment medial portion (26). Each of the pair of second segment end portions (27) can terminate in a second segment end (28). The pair of second segment end portions (27) can be slidably disposed inside of said pair of first segment tubular end portions (19). In particular embodiments, a length (29) of each of the pair of second segment end portions (27) can be correspondingly telescopically engaged within each of the pair of first segment tubular end portion interior spaces (24).

In particular embodiments as shown in FIGS. 2 through 9, the annular member (6) can have a generally rectangular or square configuration. The corners (30) of the rectangular annular member (6) can be rounded or arcuate. However, these illustrative examples are not intended to preclude an annular member (6) generally configured as: a semicircle, an oval, a semioval, an ellipse, a semiellipse, a triangle, a polygon, a freeform shape, or the like, or combinations thereof, depending upon the embodiment and the application.

Again, referring primarily to FIGS. 3 and 4, the annular member (6) can have an annular member perimeter (7) bounding an annular member interior space (31). The annular member perimeter (7) can be adjusted by sliding engagement of the pair of second segment end portions inside of the pair of first segment end portions between a contracted condition (8) in which the annular member perimeter (7) bounds a lesser annular member interior space (31) (as shown in the illustrative example of FIG. 3) in relation to an expanded condition (9), in which the annular member perimeter (7) bounds a greater annular member interior space (31) (as shown in the illustrative example of FIG. 4). Correspondingly, adjustment of the annular member perimeter (7) can provide a contracted condition (8) in which the annular member perimeter (7) has a lesser perimeter length (29) (as shown in the illustrative example of FIG. 3) in relation to an expanded condition (9), in which the annular member perimeter (7) has a greater perimeter length (29) (as shown in the illustrative example of FIG. 4). The contracted condition of the annular member perimeter (7) can be achieved by increasing the length (29) of the second segment end portions (27) correspondingly telescopically engaged within each of the pair of first segment tubular end portion interior spaces (24). Likewise, the expanded condition (9) of the annular member perimeter (7) can be achieved by decreasing the length (29) of the second segment end portions (27) correspondingly telescopically engaged within each of the pair of first segment tubular end portion interior spaces (24).

Again, referring primarily to FIGS. 2 through 9, particular embodiments of the opening support (1) can, but need not necessarily, include a securement assembly (32). The securement assembly (32) can provide releasable securement of the first segment tubular end portions (19) in incremental fixed relation to the second segment end portions (27). The securement assembly (32) operates to releasably secure at least one of the pair of second segment end portions (27) in fixed relation to the pair of first segment tubular end portions (19) at selectable discrete incremental positions (33) along the second segment end portions (27), thereby providing incremental adjustment of the annular member perimeter (7) between the expanded condition (9) and the contracted condition (8) of the annular member (6). The term "fixed relation" for the purposes of this invention means that at least one of the second segment end portions (27) is substantially immovable in at least one direction within the first segment tubular end portions (19).

Figure 8:
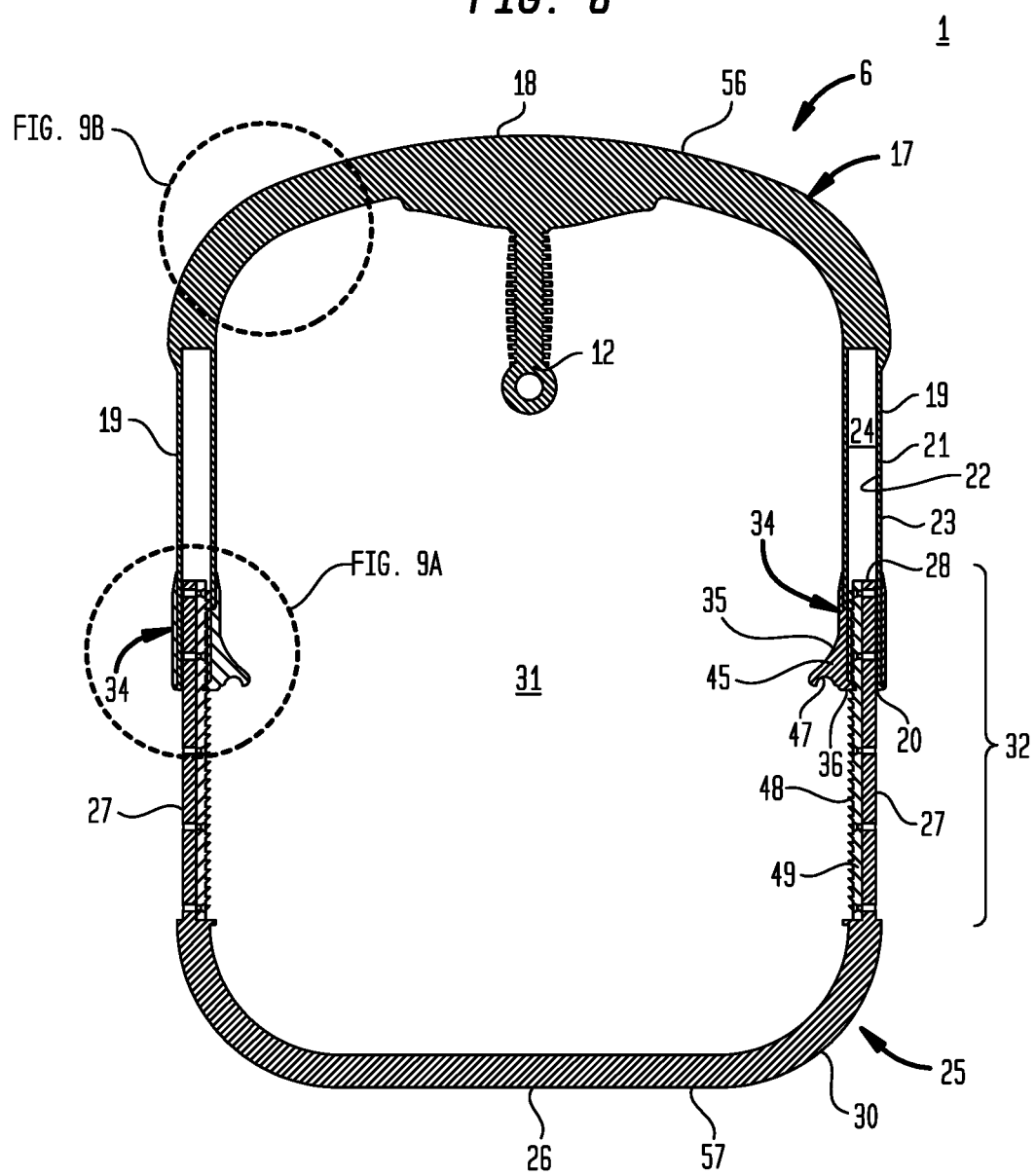
FIG. 8 is a cross-sectional view 8-8 of a particular embodiment of the container opening support system shown in FIG. 5.

Now referring primarily to FIGS. 2 through 4 and 7 through 9, particular embodiments of the securement assembly (32) can include a tubular member (34) correspondingly disposed about each of the pair of first segment tubular end portions (19) proximate the first segment tubular ends (20). The tubular member (34) can further include a biasing portion (35) terminating in a pawl (36) biased toward a first position (37) adjacent and traversing a distance across the first segment tubular end portion interior space (24) (as shown in the example of FIG. 8 in solid object line). The biasing portion (35) can be resiliently deformable to allow the pawl (36) to move toward a second position (38) in which the entirety or a lesser part of the pawl (36) traverses across the first segment tubular end portion interior space (24) (as shown in the example of FIG. 8 in broken object line). For purposes of this invention the term "pawl" means a movable element coupled to the tubular member adapted to fall into notches or interdental spaces on one of the pair of second segment end portions.

Again, referring primarily to FIGS. 2 through 4 and 7 through 9, in particular embodiments, the biasing portion (35) can, but need not necessarily, be defined by a pair of longitudinal slots (39) communicating between the tubular member interior and exterior surfaces (40)(41). The pair of longitudinal slots (39) can be disposed in the tubular member (34) extending from a tubular member first end (42) along a portion of the length (29) of the tubular member (34) towards a tubular member second end (43). Each of the pair of longitudinal slots (39) can be disposed a distance (44) apart of about 0.5 radians (rad) to about 2.2 rad. In particular embodiments, the distance (44) can be selected from the group including: about 0.55 rad to about 0.7 rad, about 0.6 rad to about 0.8 rad, about 0.7 rad to about 0.9 rad, about 0.8 rad to about 1.0 rad, about 0.9 rad to about 1.1 rad, about 1.0 rad to about 1.2 rad, about 1.1 rad to about 1.3 rad, about 1.2 rad to about 1.4 rad, about 1.3 rad to about 1.5 rad, about 1.4 rad to about 1.6 rad, about 1.5 rad to about 1.7 rad, about 1.6 rad to about 1.8 rad, about 1.7 rad to about 1.9 rad, about 1.8 rad to about 2.0 rad, about 1.9 rad to about 2.1 rad, about 2.0 rad to about 2.15 rad, or combinations thereof. However, this illustrative example is not intended to preclude embodiments in which a portion of the wall of tubular member (34) resiliently deforms out of round to achieve movement of the pawl (36) obviating the need for one or both of the pair of longitudinal slots (39).

Figure 9A:
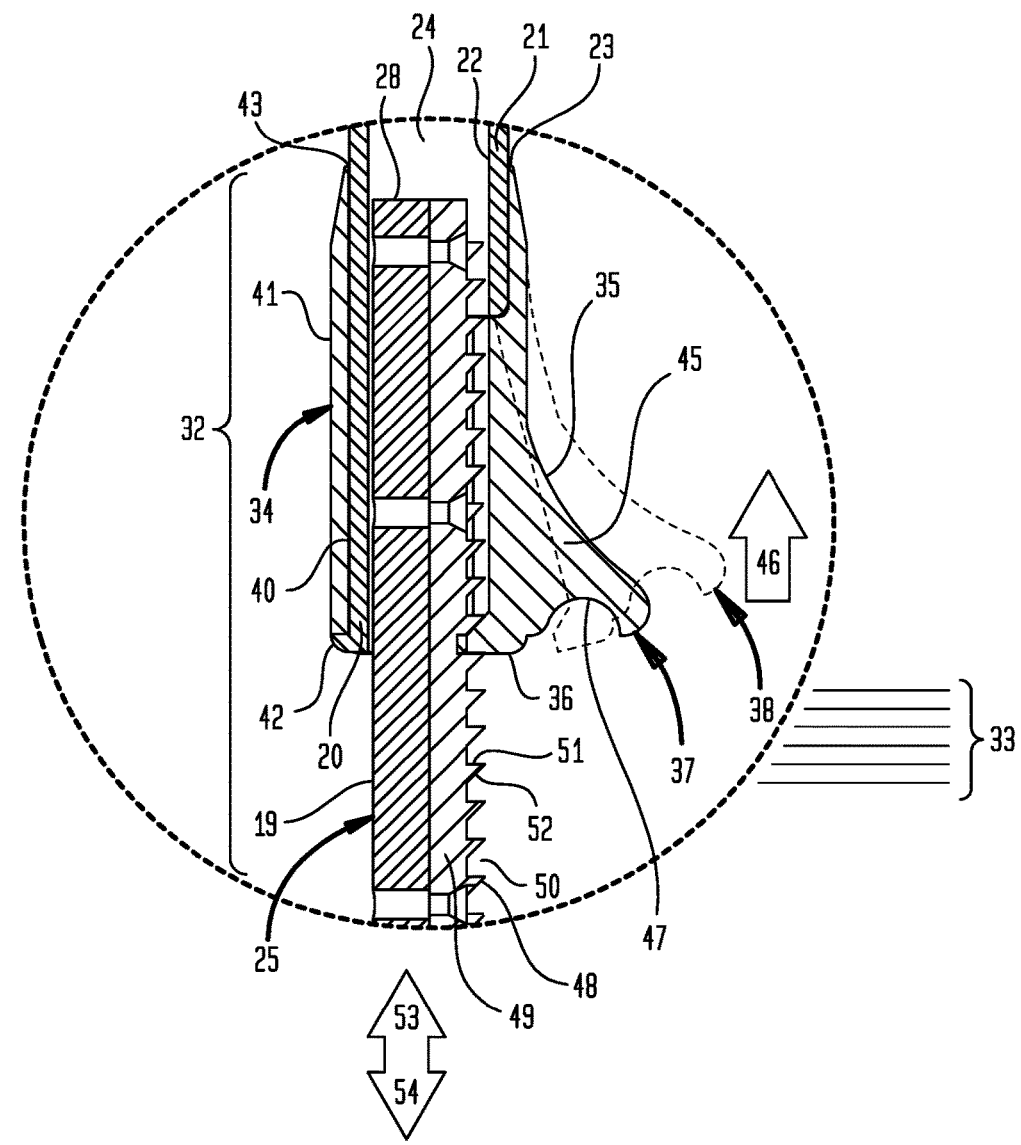
FIG. 9A is an enlarged view of a portion of FIG. 8 illustrating a particular embodiment of a biasing portion.
Figure 9B:
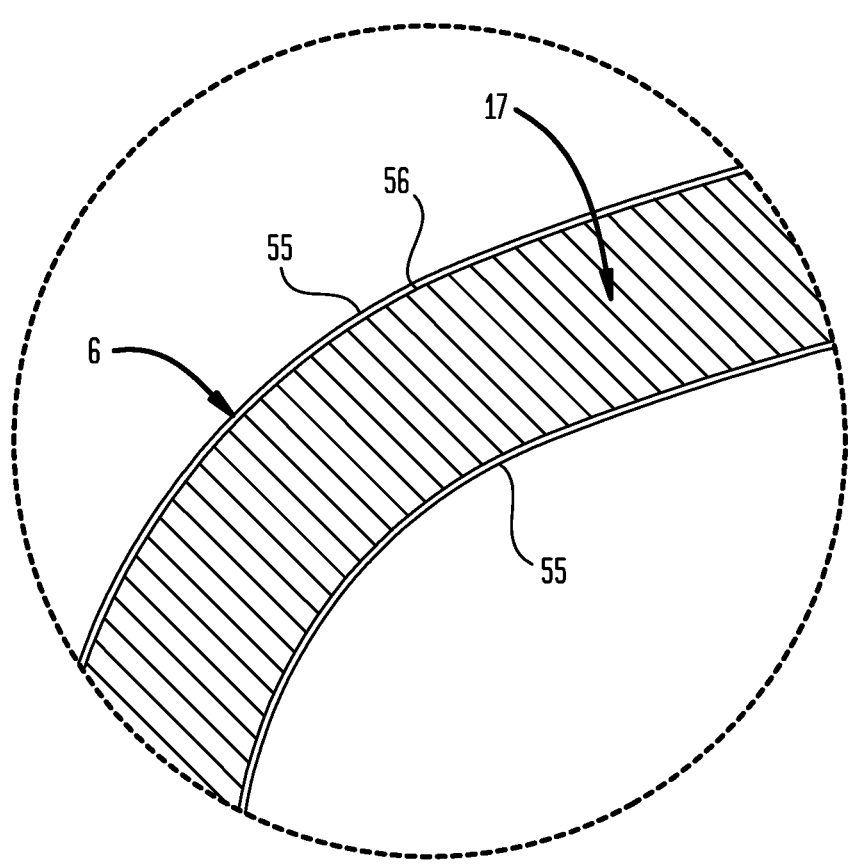
FIG. 9B is an enlarged view of a portion of FIG. 8 illustrating a particular embodiment of a tack layer.

Now referring primarily to FIGS. 2 through 4 and 7 through 9, in particular embodiments, a force receiving member (45) can, but need not necessarily, outwardly extend from the biasing portion (35) of the tubular member (34). The force receiving member (45) can transfer applied force (46) to the biasing portion (35) of the tubular member (34) to resiliently deform the biasing portion and correspondingly move the pawl from the first position (37) to the second position (38). The force receiving member (45) can, but need not necessarily, further include a force receiving surface (47). In particular embodiments, the force receiving surface (47) can, but need not necessarily, be configured to engage the a portion of the anatomy of the hand such as the thumb or finger of a hand. The force receiving surface (47) can, but need not necessarily, include patterned surface elements disposed on or in the force receiving surface (47). Patterned surface elements can extend inward or outward of the force receiving surface (47) to provide a friction enhancing texture such as dimples, protuberances, grain, ribs, or the like, or a combination thereof The illustrative example of FIG. 9, depicting a force receiving member (45) having the force receiving surface (47) is not intended to obviate other embodiments of the force receiving member (45) and force receiving surface (47). In particular embodiments, the tubular member (34), biasing portion (35), and pawl (36), can, but need not necessarily, be one piece.

Now referring to FIGS. 2 and 6 through 9, in particular embodiments, the securement assembly (32) can further include a plurality of teeth (48). The plurality of teeth (48) can be disposed in spaced apart relation on each of the pair of second segment end portions (27). In particular embodiments, the second segment end portions (27) and plurality of teeth (48) can be fabricated or formed as one piece. In particular embodiments, the plurality of teeth (48) can, but need not necessarily, be removably fastenable to each of the second segment end portions (27).

As shown in the illustrative examples of FIGS. 2 and 8, the plurality of teeth (48) can comprise a toothed rack (49) which can be removably fastened to the second segment end portions (27) by use of mechanical fasteners, interlocking configuration, adhesives, or a combination thereof. The plurality of teeth (48) can correspondingly move with the pair of second segment end portions (27) telescopically engaged with the first segment tubular end portions (19). An intermediate space (50) can occur between each adjacent pair of the plurality of teeth (48). The intermediate space (50) can be configured to receive the pawl (36) in the undeformed condition of the biasing portion (35). The pawl (36) can be moved from the first position (37) disposed in the intermediate space (50) to the second position (38) out of the intermediate space (50) by resiliently deforming the biasing portion (35) of the tubular member (34). The removable engagement and disengagement of the pawl (36) from the intermediate space (50) can permit incremental adjustment of the annular member perimeter (7) by permitting the second segment end portions (27) and first segment tubular end portions (19) to be releasably secured in fixed relation in incremental positions (33) along the plurality of teeth (48).

Now referring primarily to FIG. 8, in particular embodiments, each of the plurality of teeth (48) include first and second tooth faces (51)(52). The first tooth face (51) of each of the plurality of teeth (48) can have a steep slope, oftentimes nearly orthogonal or orthogonal to the surface from which the tooth (48) extends (whether the second segment end portion (27) or the toothed rack (49)) while the second tooth face (52) can have a moderate or gradual slope to the surface from which the tooth (48) extends. The pawl (36) positioned in the intermediate space (50) between a pair of the plurality of teeth (48) can ride over the first tooth face (51) of a plurality teeth (48), repeatedly resiliently deforming the biasing portion (35) of the tubular member (34), allowing movement of the second segment end portions (27) in a first direction (53); however, the pawl (36) positioned in an intermediate space (50) between a pair of the plurality of teeth (48) cannot ride over the second tooth face (52), thereby preventing movement of the second segment end portions (27) in a second direction (54). Typically, the second tooth face (52), having moderate or gradual slope in relation to the surface from which it extends, allows movement of pawl (36) over the plurality of teeth (48) disposed on the pair of second segment end portions (27) without user interaction to resiliently deform the biasing portion (35) of the tubular member (34) to move the pawl (36), thereby allowing unidirectional movement of the pair of second segment end portions (27) toward an expanded condition (9) of the annular member (6), thereby allowing the annular member perimeter (7) to engage and tension the internal surface (10) of the flexible container (3) but preventing movement of the pair of second segment end portions (27) toward the contracted condition (8) of the annular member (6) except by user interaction with the biasing portion (35) of tubular member (34) to disengage the pawl (36) from the intermediate space (50) to release tensioned engagement of the annular member (6) with the internal surface (10) of the flexible container (3).

Now referring primarily to FIGS. 2 through 4, particular embodiments of the container opening support system (1) can further include a handle (12). The handle (12) can be coupled to the first segment (17) of the annular member (6). In particular embodiments, the first segment (17) and the handle (12) can, but need not necessarily, be a single piece as depicted in FIGS. 2 through 4. The handle (12) can extend from the first segment (17) into the annular member interior space (31) defined by the annular member perimeter. The handle (12) can be gripped by a user (13) to move the opening support (1) from location to location or to position the container open end (2) in relation to the containable materials (5). In other particular embodiments, the handle (12) can extend from the first segment (17) away from the annular member interior space (31). In further embodiments, the handle (12) and annular member (6) can, but need not necessarily, both be disposed in one substantially flat plane. There can be a substantial advantage in the handle (12) extending from the first segment (17) of the annular member into the annular member interior space (31) defined by the annular member perimeter (7). The distribution of the mass of the annular member (6) in relation to the handle (12) yields a shorter lever arm with less mass thereby requiring less force applied to the handle (12) to move the annular member (6).

Now referring primarily to FIGS. 3 and 4, in particular embodiments, a tack layer (55) can be directly or indirectly coupled to the annular member (6). In particular embodiments, the annular member (6) and tack layer (55) can, but need not necessarily, be one piece. In particular embodiments, the tack layer (55) can be disposed as a discrete layer overlaying, applied to, or sprayed upon the annular member perimeter (7). The tack layer (55) affords a surface having a sufficiently high coefficient of kinetic friction or static friction, or combinations thereof, to oppose movement of the internal surface (10) of the open end (2) of the flexible container (3) during normal use. For the purposes of this invention, the term "tacky" generally refers to a property of a material to adhere to or resist movement in relation to another material. The tack layer (55) can be disposed over all or a portion of the first segment external surface (56), all or a portion of the second segment external surface (57), all or a portion of both the first and second segment external surface (56)(57), or combinations thereof In particular embodiments, the tack layer (55) can be a different material than the material of the annular member (6). The tack layer (55) can be a material having a greater static coefficient of friction, kinetic coefficient of friction, or both, than the annular member. The tack layer (55) can be selected from the group including a wide variety of tacky polymeric resins, such as: polyurethane, silicone, epoxy, acrylics, polyesters, melamine resins, or combinations thereof.

Now referring generally to FIGS. 1 through 9, particular methods of using embodiments of an opening support (1) can include sliding a pair of first segment tubular end portions (19) over a pair of second segment end portions (27) and biasing a pawl (36) coupled to each of the first segment tubular end portions (19) against a plurality of teeth (48) disposed in spaced apart relation on each of the pair of second segment end portions (27) to fix the position of the first segment (17) in relation to the second segment (25). The method can further include resiliently deforming the biasing portion (35) of each of a pair of tubular members (34) coupled to each of the first segment tubular end portions (19) to disengage the pawl (36) from the plurality of teeth (48) disposed on the corresponding second segment end portions (27). The methods can, but need not necessarily include inserting the annular member (6) inside an open end (2) of a flexible container (3). The methods can further include, adjusting the annular member (6) between a contracted condition (8) bounding a lesser annular member interior space (31) toward an expanded condition (9) bounding a greater annular member interior space (31), the expanded condition (9) engaging an annular member perimeter (7) with an internal surface (10) of the open end of the flexible container (3).

The method can further include engaging a tack layer (55) coupled to the annular member perimeter (7) with said internal surface (10) of the open end of the flexible container (3).

Components of the container opening support system (1), including the annular member (6), can be made by any of a numerous and wide variety of processes, depending upon the application. As non-limiting examples, the process can include press molding, injection molding, fabrication, machining, printing, additive printing, or the like, or combinations thereof.

Regarding materials, components of the container opening support system (1), including the annular member (6), can be made from any of a numerous and wide variety of materials, depending upon the application. As non-limiting examples, the material can include metal, wood, plastic, plastic-like material, rubber, rubber-like material, injection-moldable material, or the like, or combinations thereof. By way of non-limiting example, the annular member (6) can be a polymer selected from the group including or consisting of: nylon, polyethylene, polypropylene, polycarbonate, acrylonitrile butadiene styrene, or the like, or combinations thereof. As to particular embodiments, additives such as glass fibers, ultraviolet absorbing materials such as cerium oxide, titanium oxide, or zinc oxide, or combinations thereof.

As can be easily understood from the foregoing, the basic concepts of the present invention may be embodied in a variety of ways. The invention involves numerous and varied embodiments of a container opening support system and methods for making and using such a container opening support system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "biasing portion" should be understood to encompass disclosure of the act of "biasing a portion"—whether explicitly discussed or not—and, conversely, were there effectively disclosure of the act of "biasing a portion", such a disclosure should be understood to encompass disclosure of a "biasing portion" and even a "means for biasing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the container opening support systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A method of making an apparatus to support a container opening, comprising:
    disposing a first segment medial portion between a pair of first segment tubular end portions each terminating in a tube end;
    disposing a second segment medial portion between a pair of second segment end portions;
    disposing a plurality of teeth in spaced apart relation on each of said pair of second segment end portions;
    disposing one of a pair of tubular members each having a biasing portion terminating in a pawl about each of said pair of first segment tubular end portions, said biasing portion disposing said pawl adjacent said tube end; and
    slidably disposing said pair of second segment end portions inside of said pair of first segment tubular end portions to generate an annular member, said biasing portion of said pair of tubular members correspondingly engaging said pawl with said plurality of teeth of a corresponding one of said pair of second segment end portions to fix position of said pair of second segment end portions in said pair of first segment tubular end portions, said biasing portion of said pair of tubular members resiliently deformable to disengage said pawl from said plurality of teeth on each of said pair of second segment end portions.

2. The method of claim 1, further comprising forming each of said pair of tubular members, said biasing portion, and said pawl as one piece.

3. The method of claim 1, further comprising removably fastening said plurality of teeth to each of said second segment end portions.

4. The method of claim 1, further comprising coupling a tack layer to an external surface of said annular member.

5. The method of claim 4, further comprising coupling a tack layer to an external surface of said annular member, said tack layer comprises a tack polymer different from an annular member polymer.

6. The method of claim 1, further comprising coupling a handle to said first segment.

7. The method of claim 6, further comprising disposing said handle to extend from said first segment into an interior space defined by said annular member.

8. The method of claim 7, further comprising disposing said handle to extend from said first segment away from said interior space defined by said annular member.

9. The method of claim 7, further comprising disposing said handle and said annular member in a substantially flat plane.

10. The method of claim 7, further comprising forming said handle and said first segment as one piece.

11. A method of using an apparatus to support a container opening, comprising:
   sliding a pair of first segment tubular end portions of a first segment of an annular member over a pair of second segment end portions of a second segment of said annular member; and
   engaging a pawl coupled to each of said pair of first segment tubular end portions against a plurality of teeth disposed in spaced apart relation on each of said pair of second segment end portions to fix position of said first segment in relation to said second segment.

12. The method of claim 11, further comprising resiliently deforming a biasing portion of said pair of first segment tubular end portions to disengage said pawl from said plurality of teeth disposed on each of said pair of second segment end portions.

13. The method of claim 12, further comprising inserting said annular member inside of an open end of a flexible membrane.

14. The method of claim 13, wherein said flexible membrane has a closed end opposite said open end.

15. The method of claim 13, further comprising sliding said pair of first segment tubular end portions of a first segment of said annular member over said pair of second segment end portions of said second segment of said annular member to adjust said annular member between a contracted condition bounding a lesser interior space toward an expanded condition bounding a greater interior space, said expanded condition engaging an annular member perimeter with an internal surface of said open end of said flexible member.

16. The method of claim 15, further comprising gripping a handle coupled to said first segment.

17. The method of claim 16, wherein said handle extends from said first segment into an interior space defined by said annular member.

18. The method of claim 16, wherein said handle extends from said first segment away from said interior space defined by said annular member.

19. The method of claim 16, wherein said handle and said annular member lie in a substantially flat plane.

20. The method of claim 16, further comprising removably fastening said plurality of teeth to each of said second segment end portions.

21. The method of claim 20, further comprising engaging a tack layer coupled to said annular member perimeter with said internal surface of said open end of said flexible member.

* * * * *